United States Patent
Bilal et al.

(10) Patent No.: US 10,497,227 B2
(45) Date of Patent: Dec. 3, 2019

(54) HAPTIC DEVICES USING STRUCTURED METASURFACES

(71) Applicants: CALIFORNIA INSTITUTE OF TECHNOLOGY, Pasadena, CA (US); FACEBOOK, INC., Menlo Park, CA (US)

(72) Inventors: Osama R. Bilal, Pasadena, CA (US); Vincenzo Costanza, Pasadena, CA (US); Chiara Daraio, South Pasadena, CA (US); Frances Lau, Menlo Park, CA (US); Ali Israr, Menlo Park, CA (US)

(73) Assignees: CALIFORNIA INSTITUTE OF TECHNOLOGY, Pasadena, CA (US); FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/955,446

(22) Filed: Apr. 17, 2018

(65) Prior Publication Data
US 2019/0318590 A1 Oct. 17, 2019

(51) Int. Cl.
G08B 6/00 (2006.01)
F03G 7/06 (2006.01)
H02N 11/00 (2006.01)

(52) U.S. Cl.
CPC .............. *G08B 6/00* (2013.01); *F03G 7/065* (2013.01); *H02N 11/002* (2013.01)

(58) Field of Classification Search
CPC .......... G08B 6/00; F03G 7/065; H02N 11/002
See application file for complete search history.

(56) References Cited

U.S. PATENT DOCUMENTS

| 7,233,041 | B2 | 6/2007 | Duan et al. | |
| 10,128,439 | B1 | 11/2018 | Bilal et al. | |
| 2007/0194225 | A1 | 8/2007 | Zorn | |
| 2009/0002328 | A1* | 1/2009 | Ullrich | G06F 3/016 345/173 |
| 2009/0322221 | A1 | 12/2009 | Makansi | |
| 2012/0206371 | A1* | 8/2012 | Turunen | G06F 3/016 345/173 |
| 2014/0054652 | A1 | 2/2014 | Abe et al. | |
| 2014/0145836 | A1* | 5/2014 | Tossavainen | G06F 3/016 340/407.2 |
| 2015/0287293 | A1* | 10/2015 | Grant | G08B 6/00 340/407.1 |
| 2015/0377648 | A1 | 12/2015 | Sirohiwala et al. | |
| 2016/0139666 | A1* | 5/2016 | Rubin | B25J 11/003 345/633 |

(Continued)

OTHER PUBLICATIONS

Abraira, Victoria, et al., "The Sensory Neurons of Touch." *Neuron* 79, 618-639, (Aug. 2013). 22 pages.

(Continued)

*Primary Examiner* — James J Yang
*Assistant Examiner* — Kevin Lau
(74) *Attorney, Agent, or Firm* — Steinfl + Bruno LLP

(57) ABSTRACT

A haptic device can be realized with a single acoustic actuator controlling multiple unit cells by having the unit cells be composed of cantilever arms with different resonant frequencies. The unit cells can be further improved by having the cantilever arms be in a spiral shape, and more specifically an Archimedes spiral shape.

23 Claims, 6 Drawing Sheets

(56) References Cited

U.S. PATENT DOCUMENTS

2016/0351807 A1 12/2016 Scheibner
2018/0211775 A1* 7/2018 Salvatti ............... H01F 41/041

OTHER PUBLICATIONS

Anikeeva, P., et al., " Restoring the sense of touch." *Science* 350(6258), 274-275, (Oct. 2015). 3 pages.
Babaee, S., et al., "Harnessing Deformation to Switch On and Off the Propagation of Sound." *Advanced Materials* 28(8), 1631-1635, (Dec. 2015). 20 pages.
Bilal, O.R., et al., "Bistable metamaterial for switching and cascading elastic vibrations." *PNAS* 114(18), 4603-4606, (Apr. 17, 2017, published online before print). 9 pages.
Bilal, O.R., et al., "Reprogrammable Phononic Metasurfaces." *Advanced Materials*, 29(39), (Aug. 25, 2017, published online before print). 29 pages.
Bilal, O.R.,et al, "Trampoline metamaterial: Local resonance enhancement by springboards." *Applied Physics Letters* 103(11), 111901, (Sep. 2013). 4 pages.
Bilal, O.R., et al., "Ultrawide phononic band gap for combined inplane and out-of-plane waves." *Physical Review E* 84, 065701(R), (Dec. 2011). 4 pages.
Boechler, N., et al., "Bifurcation-based acoustic switching and rectification." *Nature Materials* 10(9), 665-668, (Sep. 2011). 4 pages.
Bringuier, S., et al., "Phase-controlling phononic crystals: Realization of acoustic Boolean logic gates." *The Journal of the Acoustical Society of America* 130(4), 1919-1925, (Oct. 2011). 7 pages.
Chortos, A., et al., "Pursuing prosthetic electronic skin." *Nature Materials* 15(9), 937-950, (Jul. 4, 2016). 14 pages.
Cummer, S. A., et al., "Controlling sound with acoustic metamaterials." *Nature Reviews Materials* 1, 16001, (Feb. 16, 2016). 13 pages.
Devaux, T., et al., "Asymmetric acoustic propagation of wave packets via the self-demodulation effect." *Physical Review Letters* 115(23), 234301, (Dec. 2015). 5 pages.
Foehr, et al., "Spiral-based phononic plates: From wave beaming to topological insulators." *Physics Review Letters* 120, 205501, (May 2018). 9 pages.
Freeth, T., et al., "Decoding the ancient Greek astronomical calculator known as the Antikythera Mechanism." *Nature* 444(7119), 587-591, (Nov. 2006). 5 pages.
Hatanaka, D., et al., "A phonon transistor in an electromechanical resonator array." *Applied Physics Letters* 102(21), 213102, (May 2013). 4 pages.
Hussein, M. I., et al., "Dynamics of Phononic Materials and Structures: Historical Origins, Recent Progress, and Future Outlook." *Applied Mechanics Reviews* 66(4), 040802, (May 2014). 52 pages.
Jing, H., et al., "PT-Symmetric Phonon Laser." *Physical Review Letters* 113(5), 053604, (Jul. 2014). 8 pages.
Joulain, K., et al., "Quantum Thermal Transistor." *Physical Review Letters* 116(20), 200601, (May 20, 2016). 5 pages.
Ladd, T.D., et al., "Quantum computers." *Nature* 464(7285), 45-53, (Mar. 2010). 9 pages.
Liang, B., et al., "Acoustic Diode: Rectification of Acoustic Energy Flux in One-Dimensional Systems." *Physical Review Letters* 103(10), 104301, (Sep. 2009). 4 pages.
Liang, B., et al., "An acoustic rectifier." *Nature Materials* 9(12), 989-992, (Dec. 2010). 4 pages.
Liang, B., et al., "Acoustic transistor: Amplification and switch of sound by sound." *Applied Physics Letters* 105(8), 083510, (Aug. 2014). 5 pages.
Li, F., et al., "Granular acoustic switches and logic elements." *Nature Communications* 5, 5311, (Oct. 2014). 6 pages.
Li, B., et al., "Negative differential thermal resistance and thermal transistor." *Applied Physics Letters* 88(14), 143501, (Apr. 2006). 4 pages.
Li, X. F., et al., "Tunable Unidirectional Sound Propagation through a Sonic-Crystal-Based Acoustic Diode." *Physical Review Letters* 106(8), 084301, (Feb. 2011). 4 pages.
Liu, Z., et al., "Locally Resonant Sonic Materials." *Science* 289(5485), 1734-1736, (Sep. 2000). 4 pages.
Mahboob, I., et al., "Interconnect-free parallel logic circuits in a single mechanical resonator." *Nature Communications* 2, 198, (Feb. 2011). 7 pages.
Maldovan, M., "Sound and heat revolutions in phononics." *Nature* 503(7475), 209-217, (Nov. 2013). 9 pages.
Malishava, M., et al., "All-phononic Digital Transistor on the Basis of Gap-Soliton Dynamics in an Anharmonic Oscillator Ladder." *Physical Review Letters* 115(10),104301, (Sep. 2015). 7 pages.
Menabrea, L., "Sketch of the Analytical Engine Invented by Charles Babbage, with notes by the translator Augusta Ada King, Countess of Lovelace." *Taylors Scientific Memoirs* 3,666-731, (1843).
Nghiem, B. T., et al., "Providing a Sense of Touch to Prosthetic Hands." *Plastic and Reconstructive Surgery* 135(6), 1652-1663, (Jun. 2015). 16 pages.
Popa, B.-I., et al., "Non-reciprocal and highly nonlinear active acoustic metamaterials." *Nature Communications* 5, 3398, (Feb. 2014). 5 pages.
Saal, H. P., et al., "Biomimetic approaches to bionic touch through a peripheral nerve interface." *Neuropsychologia*, 79, 344-353, (Dec. 2015). 10 pages.
Sklan, S. R., "Splash, pop, sizzle: Information processing with phononic computing." *AIP Advances* 5(5), 053302, (Apr. 2015). 30 pages.
Vahala, K., et al., "A phonon laser." *Nature Physics* 5(9), 682-686, (Aug. 2009). 5 pages.
Wang, L., et al., "Thermal Logic Gates: Computation with phonons." *Physical Review Letters* 99(17), 177208, (Oct. 2007). 5 pages.
Wijk, U., et al., "Forearm amputees' views of prosthesis use and sensory feedback." *Journal of Hand Therapy* 28(3), 269-278, (Jul. 2015). 11 pages.
Zhang, T., et al., "Acoustic logic gates and Boolean operation based on self-collimating acoustic beams." *Applied Physics Letters* 106(11), 113503, (Mar. 2015). 6 pages.
Ex Parte Quayle Action for U.S. Appl. No. 15/955,441, filed Apr. 17, 2018 on behalf of California Institute of Technology. Mail date: Jun. 13, 2018. 6 pages.

* cited by examiner

HAPTIC DEVICES USING STRUCTURED METASURFACES

TECHNICAL FIELD

The present disclosure relates to haptic devices. More particularly, it relates to haptic devices using structured metasurfaces.

BACKGROUND

Recent advances in touch-screen technology and artificial skins for robotics and prosthetics are increasing the demand for interactivity with human users. Haptic interfaces are the most important sensory feedback, after the visual feedback, allowing users to receive a tactile response to varying shapes and textures. The most common technologies for haptic interfaces today are based on either (i) electrostatic forces, used to control friction between a user's finger and a screen, or (ii) ultrasonically excited flexural waves, traveling on an elastic, uniform screen. However, the spatial resolution achievable and the force output reachable by such technologies remains limited.

A grid of connected actuators can achieve a complex tactile pattern. However, providing power and control for such a grid is a very challenging problem. In addition, most haptic actuators can be divided into two categories; bulky and powerful such as acoustic coils or thin and weak such as piezoelectric actuators. Moreover, most actuators are limited to a single polarization excitation (e.g., out-of-plane or in-plane). Therefore, the need for flexible, thin, yet scalable amplification mechanisms is apparent.

SUMMARY

In a first aspect of the disclosure, a haptic feedback device is described, comprising: an acoustic actuator; and a plurality of unit cells, each unit cell comprising a cantilever arm having at least one different resonant frequency modes from each other cantilever arm of other unit cells of the plurality of unit cells, each unit cell of the plurality of unit cells being configured at a distance from the acoustic actuator such that an acoustic signal containing a resonant frequency of an out-of-plane mode from the acoustic actuator creates a displacement amplification by the cantilever arm of the unit cell In a second aspect of the disclosure, a method of providing haptic feedback to a user is described, the method comprising: providing the user with a haptic feedback device, the haptic feedback device comprising: a mounting device; an acoustic actuator mounted in the mounting device; and a plurality of unit cells, each unit cell comprising a cantilever arm having at least one different resonant frequency modes from each other cantilever arm of other unit cells of the plurality of unit cells, each unit cell of the plurality of unit cells being configured at a distance from the acoustic actuator such that an acoustic signal containing a resonant frequency of an out-of-plane mode from the acoustic actuator creates a displacement amplification by the cantilever arm of the unit cell; and sending a signal to the acoustic actuator such that the acoustic actuator sends an acoustic signal to the plurality of unit cells.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

Figure 1:
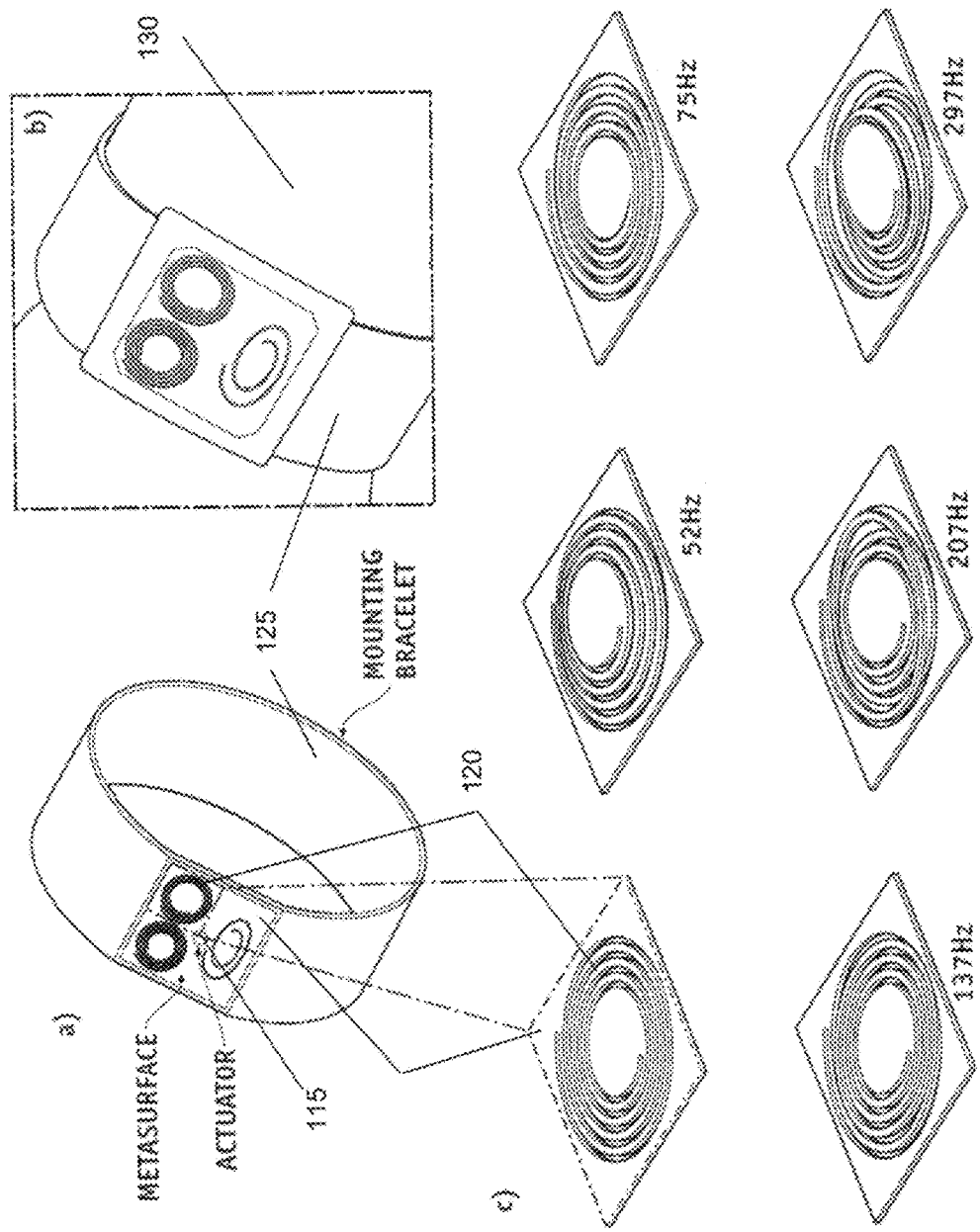
FIG. 1 illustrates an exemplary schematic of a structured metasurface mounted on a bracelet.

The present disclosure describes the use of structured metasurfaces to provide haptic feedback to a person.

Haptic feedback is defined herein as computer/electronic output tied to a user's sense of touch. This can include tactile feedback and kinesthetic feedback. Tactile feedback is the use of force or vibrations to stimulate touch receptors on the skin. Frequently this is performed on the fingertips, as they are highly sensitive and can differentiate different points of contact at greater resolution, but tactile feedback can be used on any part of the body. Kinesthetic feedback is the application of force or vibrations in a way that is registered by the muscles, tendons, and joints of the user. An example of tactile feedback would be a Braille text display and an example of kinesthetic feedback would be the force-feedback in a fly-by-wire airplane joystick. Haptic feedback can be used to simulate the touch or heft of a physical object, or it can be used to provide data to the user.

Metamaterials are structures made out of building blocks, and thanks to the properties of those building blocks and their spatial arrangement, the aggregate system has, on longer distance scales, emergent properties (e.g., optical, thermal, acoustic, elastic) that can be very different from the traits of the individual building blocks. Metasurfaces are metamaterials that operate mainly on a 2D plane. Structured metasurfaces (a.k.a. acoustic or elastic metasurfaces) are metasurfaces where the emergent property is elastic (i.e. phonic, or vibratory). In the present invention, the metasurface acoustic properties involve haptic feedback.

Actuators are device components that create controlled physical movement. Actuators can create rotation, translation, or vibration.

Piezoactuators (or "piezoelectric actuators") are actuators that convert electric current directly into linear motion by use of piezoelectric materials. One advantage of piezoactuators over other forms of actuators is their small size.

A grid of connected actuators can achieve a complex tactile pattern. However, providing power and control for such a grid is a very challenging problem. In addition, most haptic actuators can be divided into two categories; bulky and powerful such as acoustic coils or thin and weak such as piezoelectric actuators. Moreover, most actuators are limited to a single polarization excitation (e.g., out-of-plane or in-plane). Therefore, the need for flexible, thin, yet scalable amplification mechanisms is apparent. One such amplification mechanism is the use of a cantilever arm.

A cantilever arm is an elongated structure that is fixed at only one end. If a vibratory excitation occurs near the cantilever arm at or near a resonant frequency of the arm, the cantilever arm will vibrate at that resonant frequency. A cantilever arm can be made in various shapes, but a particularly efficient (in arm length vs. 2D footprint) shape is an Archimedean spiral. Other example shapes include star patterns, rectangular spirals, zig-zagging cutouts, web-like cutouts, and non-geometric designs. Additionally, the arms can be tabs extending out of the surface, instead of being cut out of the surface. Additionally, multiple shapes can be used together, such as interlocking or overlapping spirals. Typically, these models might not have the displacement efficiency (displacement amplification to footprint ratio) as the spiral, but they might have other desirable design characteristics. The spiral pattern can also include a center disc portion for an increased tactile surface area and resonating mass. In all cases there exists clear amplification behavior, where the cantilever arms work as an amplifier of the signal. This stems from the fact that resonances amplify displacement, velocity and acceleration.

By elongating such a beam and coiling it up in a spiraling pattern, two important characteristics are achieved. Firstly, many different mode shapes can be encoded within a narrow frequency range. Mode shapes (or structural modes) describe the deformations of the spiral at certain resonant frequencies, described by in-plane deformations (shifts, compressions, rotations, etc.), out-of-plane deformations, or combinations of both. Secondly, space is utilized efficiently. This allows the targeting of many of the vibratory haptic receptors in the skin, which operate within the range of 5-400 Hz, in a relatively small space. In other words, it efficiently increases the modal (polarizations/sensations), spatial, and frequency resolution of an actuator while amplifying its output force and displacement distance. A typical efficient spiral pattern is an Archimedean spiral.

An Archimedean spiral (or "arithmetic spiral") is a spiral where the points on the spiral are displaced from the center in a linear fashion. In other words, as one traverses the spiral from the center at a constant rate along the spiral, the distance from the center increases at a constant speed and circles the center at a constant angular velocity. In polar co-ordinates, a normal Archimedean spiral can be described by $r=a+b\theta$, where r is the distance from the center, $\theta$ is the angle of rotation around the center, and a and b are real constants. A general Archimedean spiral can be described by $r=a+b\theta^{(1/c)}$, where c is a real constant. In polar coordinates, the spiral can be represented by $r(s)=R-(R-r)s$, $\varphi(s)=2\pi ns$, where r is the inside radius, R is the outside radius, n is the number of turns and $s \in [0; 1]$.

An embodiment of the structured metasurface consists of a layer of structured unit cells (or pixels) designed to include resonant elements (e.g. spirals) that can be selectively excited by low-power transducers, the selection being based on the particular resonant modes of each of the unit cells. The operational frequencies of metasurfaces span multiple orders of magnitude. The use of local resonances, as opposed to flexural waves on a uniform rigid surface, allows one to locally amplify a signal, thereby improving the tactile force amplitude and tactile resolution. Each unit cell can be fabricated with sub-millimeter thickness and can act as an individual tactile pixel.

The structural dynamics (resonating modes) of a unit cell can be designed by modeling the dynamics of the unit cell using the finite element method, such as with COMSOL™ Multiphysics software. With this finite element modeling, the operational frequencies of a given pixel shape can be determined by calculating its resonant mode shapes. Each frequency has a unique deformation pattern that can translate to a different sensation upon contact with the skin (see, for examples, FIGS. 1 and 2). For example, one possible mode shape is a vertical motion for the core of the pixel, while another mode shape is a transverse motion of the spiral. Both mode shapes take place at neighboring frequencies, however with vastly different deformation patterns (in-plane and out-of-plane). Another mode is a tilting motion around a horizontal centerline passing through the pixel. Additional modes include in-phase and out-of-phase vertical motions for the outer edge of the spiral.

The individual pixels can be actuated with low-power piezoelectric elements placed on the metasurface. Each unit cell in the metasurface can be tuned to respond to a different resonance frequency. When the surface is excited with a single-frequency harmonic signal, only a single resonator, or a small group of resonators, will activate and amplify the signal. When a periodic signal consisting of several frequencies is used for excitation, it can actuate a plethora of resonators, producing a complex tactile pattern. Additionally, the pattern can have a temporal component, making the tactile sensation "move" across the skin. This can be used to indicate direction to the user, either linear (e.g. a series of cells activated in sequence in a line) or rotational (e.g. a circling pattern of activated cells). At higher cell density, more complex patterns can be transmitted to the user.

The complex patterns can be realized as a code or "language" that the user can learn to provide a tactile data input to the user, thereby freeing up other senses such as sight and hearing, or replacing sight and/or hearing if that sense is disabled. The more tactilely discernable unit cells the metasurface has, the more complex the "language" can be (i.e. higher number of tactilely discernable symbols). The symbols can be shapes (e.g. geometric shapes, patterns, abstract shapes, 2D figures of objects) and/or they can be motions (i.e. a tactile sensation that moves over time, such as tracing a circle or line).

Additionally, if the metasurface is not in contact with the skin but rather given a gap of, for example, about 0.5 mm between the metasurface and the skin, then only the structural modes that extend a metasurface portion (e.g. the spiral) out-of-plane will be strongly received by the skin receptors, unless additional out-of-plane structures are added to transmit the vibrations to the skin (e.g. thin hairs extending from the metasurface). Additionally, the gap helps insulate vibrations propagating through the entire metasurface and prevent them from being felt everywhere on the skin. This also allows the metasurface cantilever room to fully actuate, instead of being dampened by contact with the skin.

Generally, a range of 5-400 Hz is the bandwidth of skin sensitivity. Tests suggest that the ability of the skin (on the arm) to distinguish between two excitations are those that are separated by about 15 mm in space and 10 Hz in frequency. If a more accurate response is required, one can increase the separation in either space or frequency or both. This sensitivity is not uniform across the body: for example, fingertips will generally have higher spatial and frequency sensitivity than the arm, and other areas might have lower sensitivity.

The versatility and scalability of the tactile patterns possible with the metasurface platform opens many possibilities for a wide range of applications. For example, a metasurface grid composed of a few macro-pixels (patches of multiple pixels excited by a single actuator) can act as a wearable Braille communicator. Such platforms can also be used for prosthesis feedback. With enough resolution, one can induce realistic touch sensations on different parts of the human body.

Additionally, the metasurface can prospectively be adapted to create kinetic feedback, with unit cells creating larger amplitude vibrations intended to be felt kinetically, using resonance selection to control the location of the vibration.

An additional use of the metasurface unit cell is described in "Bistable metamaterial for switching and cascading elastic vibrations." by Osama R Bilal, André Foehr, and Chiara Daraio, *Proceedings of the National Academy of Sciences*, 114(18):4603-4606, 2017, the entirety of which is incorporated by reference herein.

A system of making the unit cells reprogrammable is described in "Reprogrammable phononic metasurfaces" by Osama R Bilal, André Foehr, and Chiara Daraio, *Advanced Materials*, 29(39), 2017.

Materials and Uses

An example material for the metasurface is polycarbonate at 0.5 mm thickness. Other materials and thicknesses can be used—for example, a polycarbonate metasurface of 0.1-0.5 mm thickness, so long as they can resonate at a tactilely perceptible frequency with a tactilely perceptible displacement. The material can be, overall, rigid or flexible, as needed for the mounting platform being used (see below).

The use of advanced manufacturing methods allows the selection of arbitrary pixel shape and density. The metasurfaces can then be incorporated in a multilayer device (for example, including a layer of pixel-addressed piezoactuators) and can be embedded in an insulating mounting platform (e.g., bracelet or T-shirt), to create an actuated, flexible skin. Examples of wearable platforms include wristbands, armbands, headbands, shirts, glasses/goggle frames, gloves, socks, shoes, and hats. The platform can also be a non-wearable device that the user makes physical contact or proximity with. Examples include keyboards, tablets, chairs, armrests, wall-plates, and desktops.

FIG. 1 shows an example schematic of a metasurface (110) composed of three spiral unit cells (120) being driven by a single actuator (115), mounted on a bracelet (125). Panel a) shows the metasurface used on a wearable bracelet, with panel b) showing an example of the bracelet (125) being worn on the wrist (130) of a user. Panel c) shows a blown-up depiction of one of the unit cells, as well as deformations (i.e. structural modes) of the spiral of the unit cell at different frequencies (i.e. 52 Hz, 75 Hz, 137 Hz, 207 Hz, and 297 Hz). At 0 Hz, there is, of course, no deformation, and minimal deformation at off-resonant frequencies.

Figure 2:
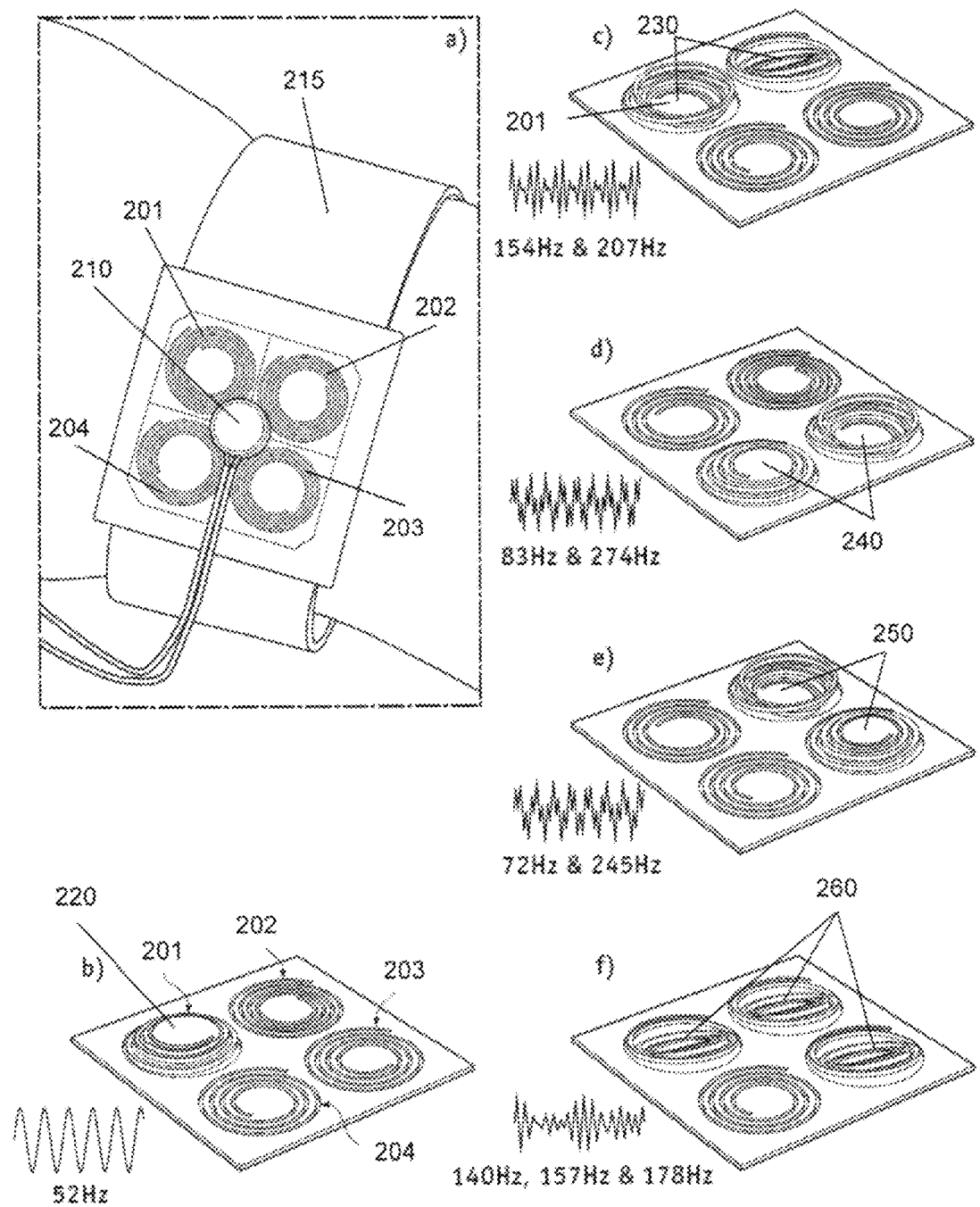
FIG. 2 illustrates an exemplary configuration showing a single actuator controlling multiple unit cells of a structured metasurface.

FIG. 2 shows how selective resonant frequency tuning allows a single actuator (210) control multiple unit cells (201-204). Panel a) shows the device (215) as-worn with a single actuator (210) driving four unit cells (201-204). Panel b) shows the first unit cell (201, 220) having a perceptible mode shape when the actuator (210—not shown in panels b)-f)) is providing a 52 Hz signal. Note that the second (202), third (203), and fourth (204) unit cells do not display a perceptible mode shape, either because they do not resonate at 52 Hz, or the resonance is primarily in-plane. Panel c) shows the first and second cells (230) having a perceptible mode shape when the actuator (210) provides a signal that is a combination of 154 Hz and 207 Hz. Note that the first unit cell (201) shows a different mode shape than it did in panel a), because it is being resonated at a different frequency (52 Hz vs. 154 Hz). Panel d) shows the same system having an input signal (from the actuator (210)) at a combination of 83 Hz and 274 Hz, providing perceptible mode shapes in unit cells three and four (240). Panel e) shows the system having an input signal at a combination of 72 Hz and 245 Hz, providing perceptible mode shapes in unit cells two and three (250). Panel f) shows the system having an input signal at a combination of 140 Hz, 157 Hz, and 178 Hz, providing perceptible mode shapes in unit cells one, two, and three (260). Note that the mode shapes can be different between unit cells (as shown in panels c)-e)) or be the same (as shown in panel f)). While this example shows the number of frequency components of the input signal being the same as the number of perceptively resonating unit cells, it is possible to design the unit cells to have overlapping mode frequencies, such that a single frequency can perceptively resonate two or more unit cells. However, it might be preferable to avoid this overlap situation to more precisely control the output.

Figure 3:
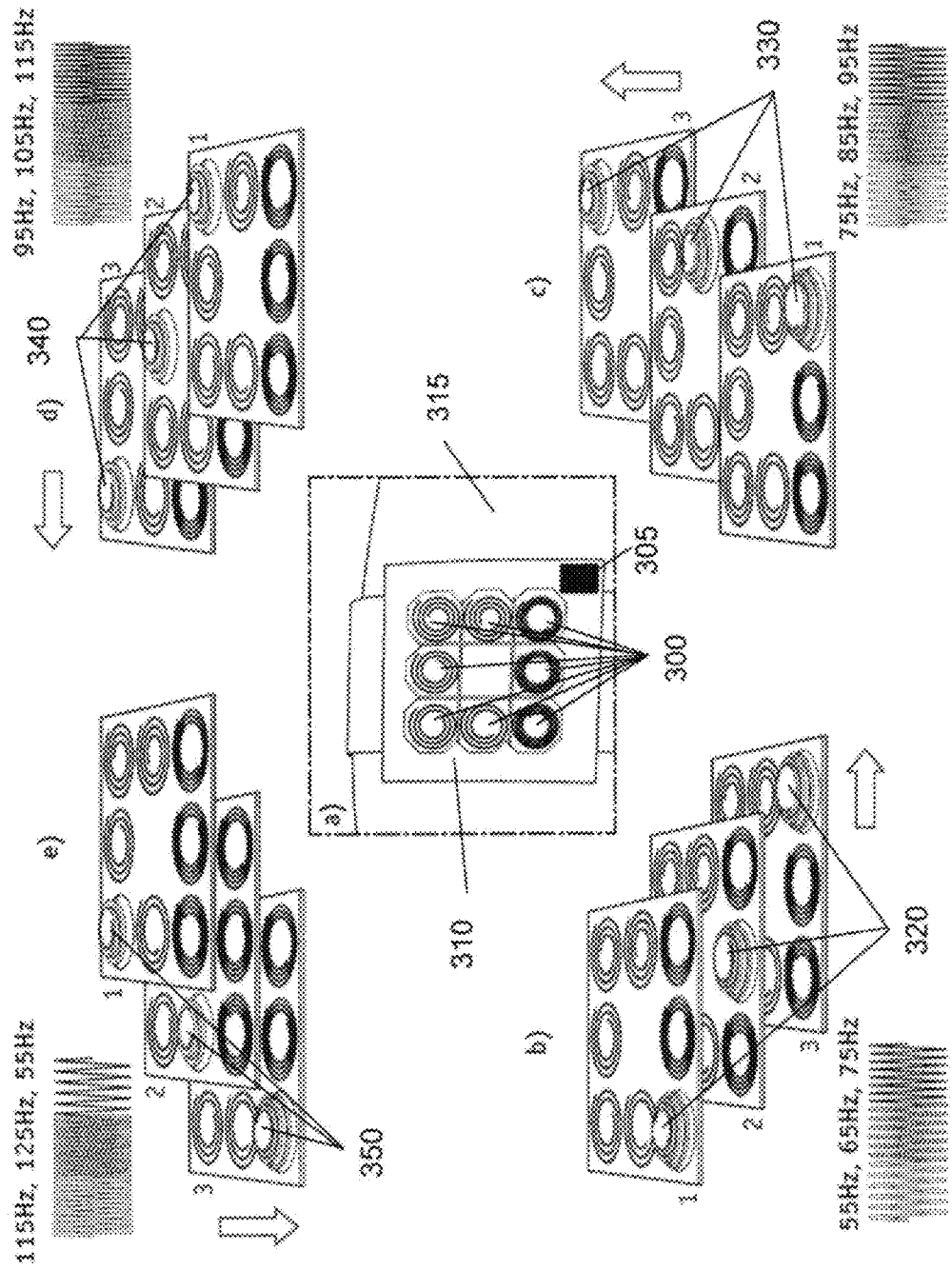
FIG. 3 illustrates an exemplary system utilizing a structured metasurface to indicate direction.

FIG. 3 shows an embodiment of indicating direction with the metasurface. A metasurface device (310) worn on the wrist or arm (315) can be used to indicate direction to a user. The device (310) would have a plurality of unit cells (300), in this case nine, being driven by a single actuator (not shown). The device can also include a device for detecting the orientation of the device (not shown), such as a gyroscope. In order to show direction, different unit cells are "activated" (made to have a perceptible mode shape) in sequence in a line. For example, panel b) shows a sequence for indicating "right", buy sequentially activating unit cells in a row from left to right (320) by the actuator providing a sequence of frequencies, first 55 Hz, then 65 Hz, and finally 75 Hz. The time span of each frequency can vary, but generally should be engineered to allow the user to differentiate between the activations in a way that the user would feel a sequence of activations and not perceive the unit cells activating at the same time. Panel c) shows an indication of a forward direction by the sequential activation of unit cells from back to front (330). Panel d) shows an indication of a leftward direction by an activation of unit cells from right to left (340) and panel e) shows an indication of a reverse direction by an activation of unit cells from front to back (350). Other directions, such as up, down, or a non-orthogonal direction, can also be indicated in a similar manner, if the device is oriented in an appropriate direction. Additionally, a rotational direction (e.g. clockwise or counter-clockwise) can be indicated by having the unit cells activated in a circular sequence.

Various types of actuators can be used to stimulate the unit cells. Examples include linear resonant actuators, acoustic coil actuators, eccentric rotating mass (for example, a small motor driving an eccentric rotating mass creating vibrations), and active materials (for example, electroactive polymer actuators, piezoelectric transducers (piezoactuators), shape memory alloys, and shape memory polymers). The different actuator types present various design characteristics. For example, acoustic coils tend to be strong, but bulky, whereas piezoelectric transducers are thinner, but also weaker.

Figure 4:
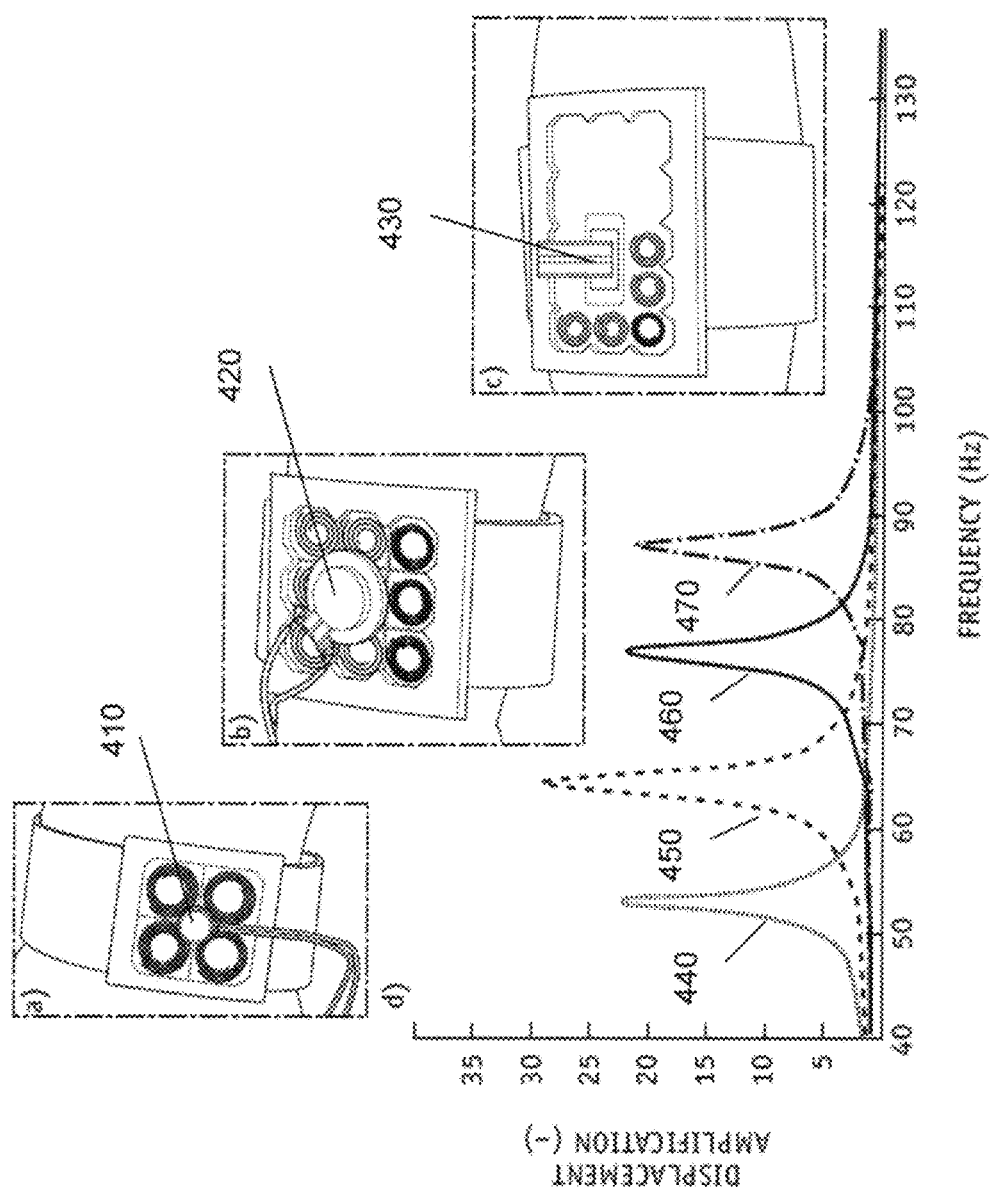
FIG. 4 illustrates examples of actuators that can be used with a structured metasurface and a graph showing example cell responses from an acoustic coil actuator.

FIG. 4 shows three different actuators configured on a platform and a graph showing displacement of different cells stimulated by an acoustic coil actuator. Panel a) shows a configuration with a linear resonant actuator (410), panel b) shows a configuration with an acoustic coil actuator (420), and panel c) shows a configuration with a piezoelectric transducer (430). Panel d) of FIG. 4 shows an example displacement amplification (in multiples of the actuator deformation) for different unit cell spirals (440, 450, 460, 470) at different frequencies, for an acoustic coil actuator, showing how the pixels can show differentiable responses at given resonant frequencies.

Figure 5:
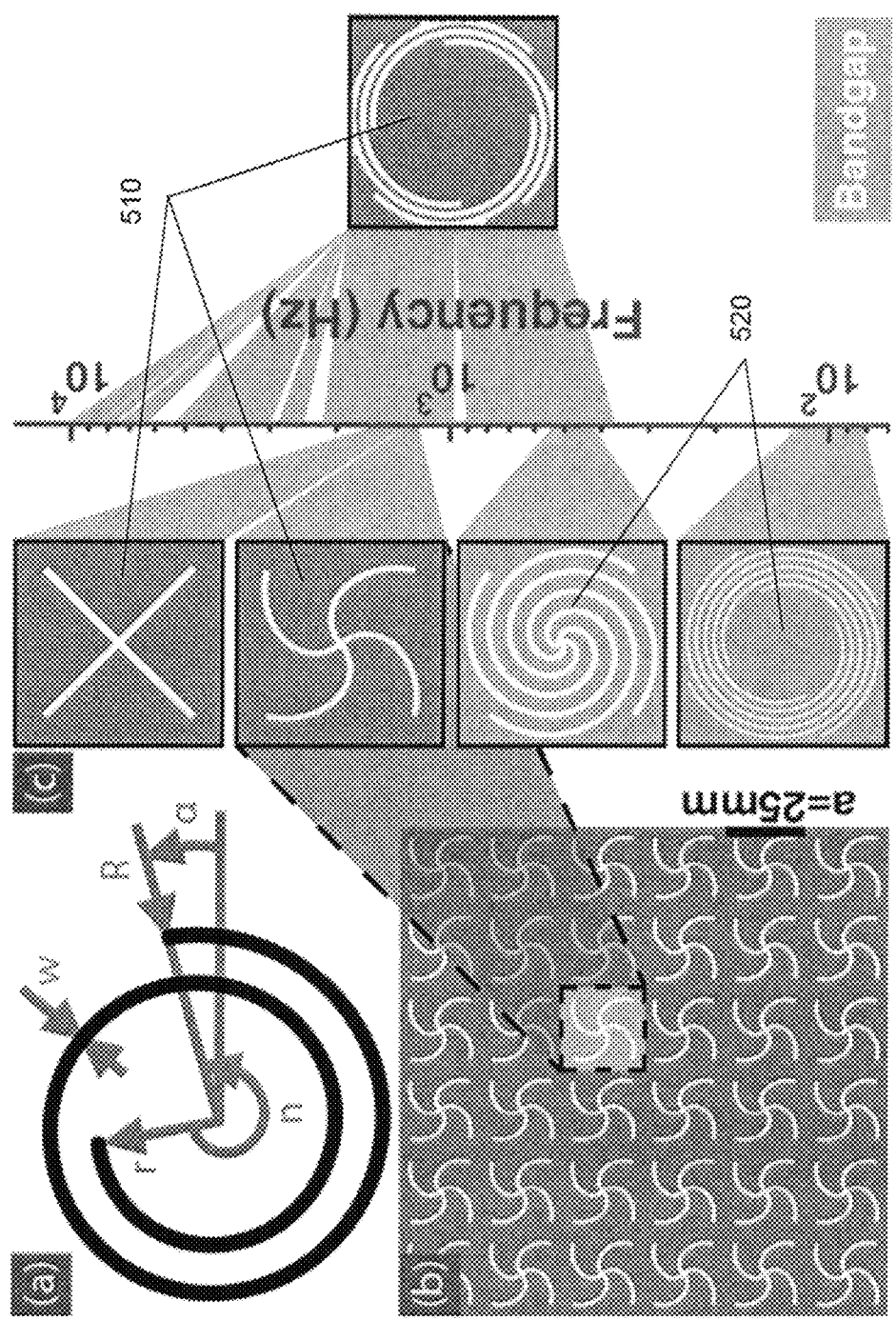
FIG. 5 illustrates exemplary band gaps of a periodic array of unit cells of different designs.

FIG. 5 shows in panel (a) a schematic of an Archimedean spiral with its parameters, in panel (b) an example structured metasurface is shown composed of a periodic array of spirals, the white areas indicating the absence of material. Panel (c) shows varying spiral geometries with flexural band gaps shown in the shaded areas. The band gaps span two decades of frequencies, while keeping constant the lattice size a=25 mm, thickness th=3 mm, density p=1018 Kg/m3, Young's Modulus E=2 GPa, and Poisson's ratio=0.33. Three of the unit cells (510) exhibit Bragg scattering and two of the unit cells (520) exhibit local resonances.

Figure 6:
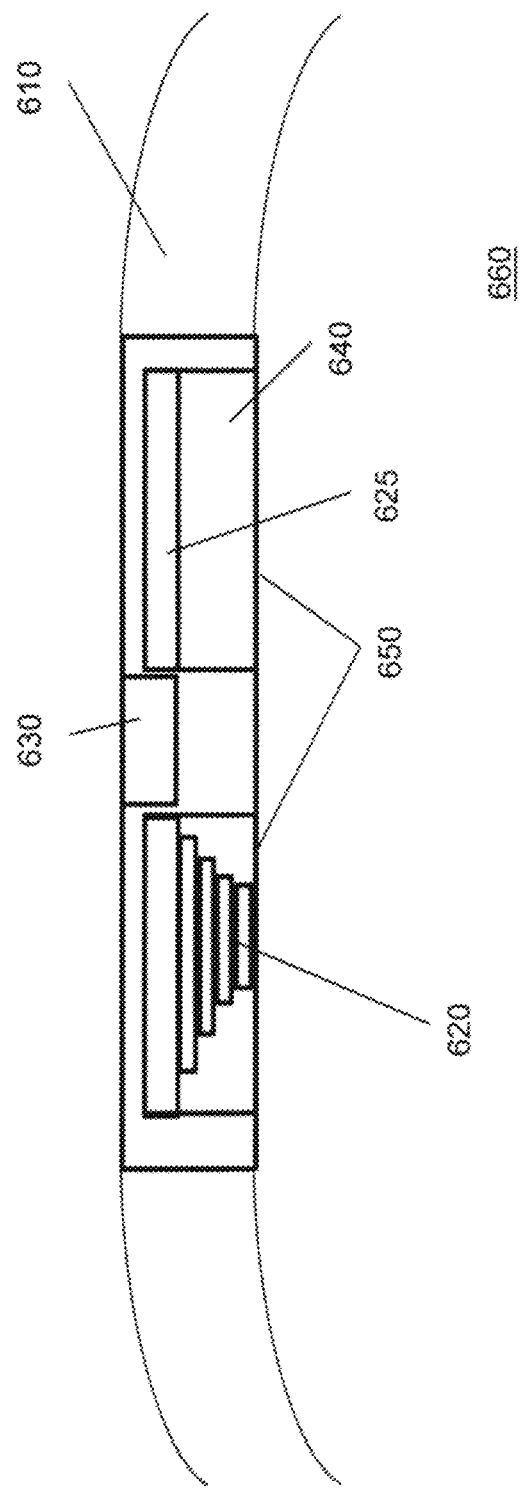
FIG. 6 illustrates an exemplary cross-section view of a structured metasurface haptic feedback device.

FIG. 6 shows a cross-section (not drawn to scale) of a wearable device (610) incorporating the metasurface with two cells (620, 625) being driven by a single actuator (630). The device is shown with one cell (620) exhibiting a tactilely discernable mode and the other cell (625) not exhibiting a tactilely discernable mode. The cells (620) are separated from the body (660) by a gap (640). In an embodiment, the actuation (620) is separated from the body (660) by a thin membrane, to protect the unit cells from the environment and prevent the spirals from catching on the skin of the user.

Example 1

A metasurface is fabricated with eight pixels arranged in a 3×3 grid with total dimensions of 42 mm×42 mm×0.5 mm (see FIG. 3). The pixels are designed to have the same first mode shape (vertical motion at the center of the pixel) with 10 Hz separations in resonance frequency. The metasurface is mounted on a 3D printed rubber bracelet (made out of TangoBlack™ using a Stratasys Objet500™ printer). The combination of the bracelet and the metasurface can provide directional information to a user when excited with a time signal activating different spiral resonators in sequence. This feature could be used in visionless navigations systems. For example, to communicate a left turn, an excitation signal of 1 second at 55 Hz, followed by another at 65 Hz and finally 75 Hz can be felt on the skin as a continuous stroke towards the left (see Panel d of FIG. 3).

Example 2

The polycarbonate sheets used to construct the metasurface has thickness of 0.5 mm, a Young's modulus of 2e^9, a density of 1200 Kg/m^3, and a bend radius less than 10 mm. The Archimedean spiral cut has a width of 0.5 mm, inside radius of 0.2a, outside radius of 0.475a, and between 2.5-4.25 turns. All the polycarbonate sheets are fabricated using standard CNC (computer numerical control) machining (model: PCV-60 50 TAPER™). The metasurface is mounted in a TangoBlack™ bracelet with an attached acoustic coil [Tectonic Elements™ TEAX13C02—8/RH 13 mm Exciter 8 Ohms] at the center. The acoustic coil is excited by a computer signal that passes through a Topping™ audio amplifier [TP22]. The out-of-plane displacement of the core of each pixel is measured using a Polytec™ laser Doppler vibrometer (LDV). The range of displacements that can be measured using the LDV is usually in the sub-millimeter scale. Therefore, we excite the metasurface with a small amplitude signal (e.g. 10 mV) at the center of the pixel. The amplification factor is defined as the ratio between the displacement at the center of the pixel and the displacement at the actuator attachment point. The displacement amplification factors range between 10-40 fold depending on the pixel geometry.

The harmonic force exerted by the spirals on the skin is measured using a calibrated piezoelectric disc at a fixed distance from the metasurface. In order to avoid overloading the sensor, we excite the metasurface using a low amplitude force. Then we measure the force signal at both the center of the metasurface (in this case, the attachment point of actuator) and the center of each pixel. Similar to the displacement, the force amplification factor for each pixel is calculated. The amplification in force ranges between 1.5-8 times depending on the pixel geometry.

Example 3

To test the interface, a user study was carried out where the metasurface is excited with either a resonant or neighboring off-resonance frequency (62 and 50 Hz respectively). The users are asked to indicate which type of vibration they felt (strong or weak). The amplitude of both frequencies is kept constant. The test included 120 trails on 4 different users. The users identified the correct type of excitation 94% of the time. This validates the haptic interface as a filter that only allows the pre-programmed resonant modes to propagate to the skin in a distinguishable manner.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which disclosure pertains.

The references in the present application, shown in the reference list below, are incorporated herein by reference in their entirety.

REFERENCES

[1] Alex Chortos, Jia Liu, and Zhenan Bao. Pursuing prosthetic electronic skin. *Nature materials*, 15(9):937, 2016.

[2] Hannes P Saal and Sliman J Bensmaia. Biomimetic approaches to bionic touch through a peripheral nerve interface. *Neuropsychologia*, 79:344-353, 2015.

[3] Ulrika Wijk and Ingela Carlsson. Forearm amputees' views of prosthesis use and sensory feedback. *Journal of Hand Therapy*, 28(3):269-278, 2015.

[4] Bao Tram Nghiem, Ian C Sando, R Brent Gillespie, Bryan L McLaughlin, Gregory J Gerling, Nicholas B Langhals, Melanie G Urbanchek, and Paul S Cederna. Providing a sense of touch to prosthetic hands. *Plastic and reconstructive surgery*, 135(6):1652-1663, 2015.

[5] Polina Anikeeva and Ryan A. Koppes. Restoring the sense of touch. *Science*, 350(6258):274-275, 2015.

[6] Osama R Bilal, André Foehr, and Chiara Daraio. Bistable metamaterial for switching and cascading elastic vibrations. *Proceedings of the National Academy of Sciences*, 114(18):4603-4606, 2017.

[7] Osama R Bilal, André Foehr, and Chiara Daraio. Reprogrammable phononic metasurfaces. *Advanced Materials*, 29(39), 2017.

[8] André Foehr, Osama R Bilal, Sebastian D Huber, and Chiara Daraio. Spiral-based phononic plates: From wave beaming to topological insulators. *arXiv preprint arXiv:1712.01360*, 2017.

[9] Victoria E Abraira and David D Ginty. The sensory neurons of touch. *Neuron*, 79(4):618-639, 2013.

[10] K. F. Graff, *Wave motion in elastic solids* (Courier Corporation, 2012)

[11] F. Bloch, *Zeitschrift für Physik A Hadrons and Nuclei* 52, 555 (1929)

What is claimed is:

1. A haptic feedback device comprising:
   a metasurface;
   an acoustic actuator mounted on the metasurface; and
   a plurality of unit cells in the metasurface,
   each unit cell comprising a cantilever arm, the cantilever arm being spiral in shape and having at least one different resonant frequency modes from other cantilever arms of other unit cells of the plurality of unit cells,
   each unit cell of the plurality of unit cells being configured at a distance from the acoustic actuator such that an acoustic signal containing a resonant frequency of an out-of-plane mode from the acoustic actuator creates a displacement amplification by the cantilever arm of the unit cell,
   wherein the metasurface is configured such that sending a first signal to a unit cell creates a first deformation of the cantilever arm of the unit cell and sending a second signal to the unit cell creates a second deformation of the cantilever arm, the first deformation providing a different tactile sensation than the second deformation.

2. The haptic feedback device of claim 1, further comprising a mounting device for the acoustic actuator and the plurality of unit cells.

3. The haptic feedback device of claim 2, wherein the mounting device is configured to provide a gap between the plurality of unit cells and a user's body.

4. The haptic feedback device of claim 3, wherein the gap is 0.5 mm.

5. The haptic feedback device of claim 2, wherein the mounting device is a wearable device.

6. The haptic feedback device of claim 5, wherein the wearable device is configured to be worn on the arm.

7. The haptic feedback device of claim 1, wherein the actuator comprises one of: a linear resonant actuator, an acoustic coil actuator, an electroactive polymer actuator, an eccentric rotating mass, and an active material.

8. The haptic feedback device of claim 1, wherein the metasurface is comprised of polycarbonate.

9. The haptic feedback device of claim 8, wherein the polycarbonate is 0.1 to 0.5 mm thick.

10. The haptic feedback device of claim 1, wherein the plurality of unit cells comprises more than four unit cells.

11. The haptic feedback device of claim 1, wherein the cantilever arm is in a spiral shape.

12. The haptic feedback device of claim 11, wherein the spiral shape is an Archimedes spiral.

13. A method of providing haptic feedback to a user, comprising:
   providing the user with a haptic feedback device, the haptic feedback device comprising:
   a mounting device;
   a metasurface in the mounting device;
   an acoustic actuator mounted in the mounting device onto the metasurface; and
   a plurality of unit cells in the metasurface,
   each unit cell comprising a cantilever arm, the cantilever arm being spiral in shape and having at least one different resonant frequency mode from other cantilever arms of other unit cells of the plurality of unit cells,
   each unit cell of the plurality of unit cells being configured at a distance from the acoustic actuator such that an acoustic signal containing a resonant frequency of an out-of-plane mode from the acoustic actuator creates a displacement amplification by the cantilever arm of the unit cell or such that an acoustic signal containing a resonant frequency of an in-plane mode from the acoustic actuator creates a lateral motion of the cantilever arm, or both;
   sending a first signal to the acoustic actuator such that the acoustic actuator sends a first acoustic signal to the plurality of unit cells creating a first tactilely discernible mode shape in at least one of the plurality of unit cells creating a first deformation pattern; and
   sending a second signal to the acoustic actuator such that the acoustic actuator sends a second acoustic signal to the plurality of unit cells creating a second tactilely discernible mode shape in at least one of the plurality of unit cells creating a second deformation pattern, the first deformation pattern having a different sensation to the user than the second deformation pattern.

14. The method of claim 13, wherein the acoustic signal has a combination of frequencies that only causes a tactilely discernable acoustic mode shape in one of the plurality of unit cells.

15. The method of claim 13, wherein the acoustic signal has a combination of frequencies that causes tactilely discernable acoustic mode shapes in more than one of the plurality of unit cells.

16. The method of claim 15, wherein the tactilely discernable acoustic mode shapes comprise both in-plane deformations and out-of-plane deformations.

17. The method of claim 13, wherein the acoustic signal changes over time.

18. The method of claim 17 wherein the acoustic signal is configured to create tactilely discernable acoustic mode shapes in a sequence that provides a user an indication of direction.

19. The method of claim 18, wherein the direction is linear.

20. The method of claim 18, wherein the direction is rotational.

21. The method of claim 17, wherein the acoustic signal is configured to create symbols in a tactile language.

22. The method of claim 21, wherein the tactile language comprises at least one of shapes and motions.

23. The method of claim 1, wherein the spiral shape is an Archimedes spiral.

\* \* \* \* \*